Sept. 30, 1924.  
E. ERICSSON  
1,509,896  
CASTING MACHINE FOR THE MANUFACTURE OF CORE CASTINGS SUCH AS TUBES AND THE LIKE  
Filed Aug. 9, 1922  
4 Sheets-Sheet 1
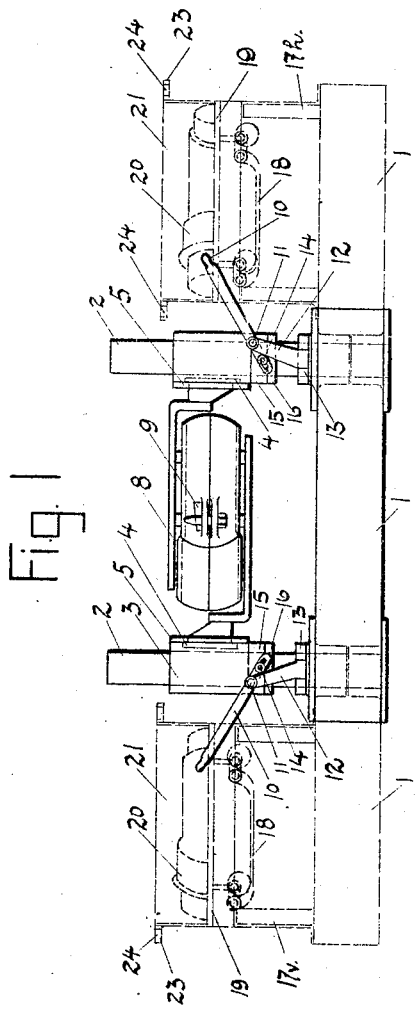
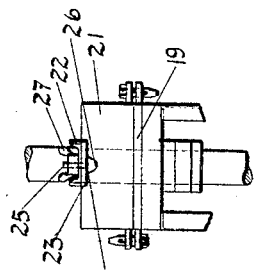
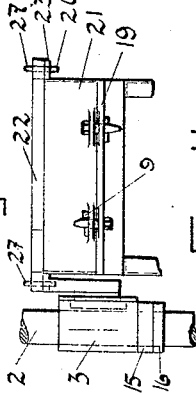
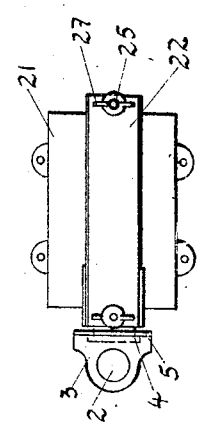
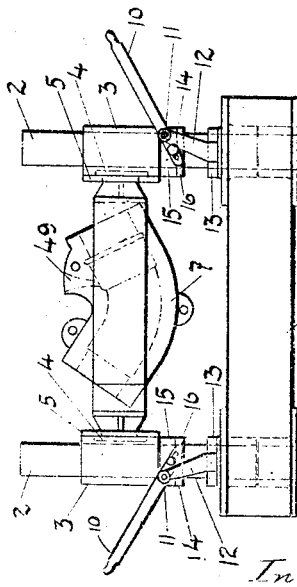
Inventor
Evert Ericsson
By *illegible*
Attorney Sept. 30, 1924.
E. ERICSSON
1,509,896
CASTING MACHINE FOR THE MANUFACTURE OF CORE CASTINGS SUCH AS
TUBES AND THE LIKE
Filed Aug. 9, 1922
4 Sheets-Sheet 2
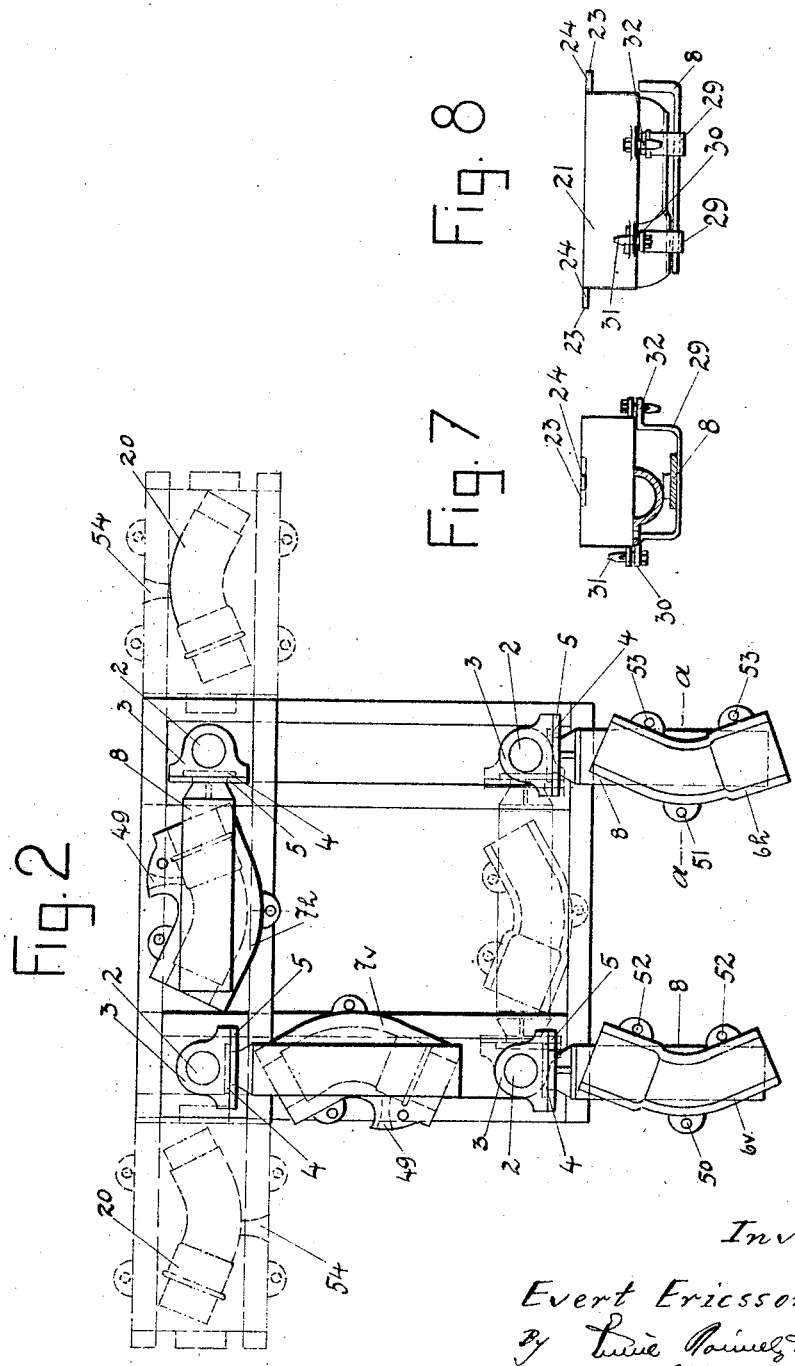
Inventor:
Evert Ericsson
By Louis Painezke
Attorney.

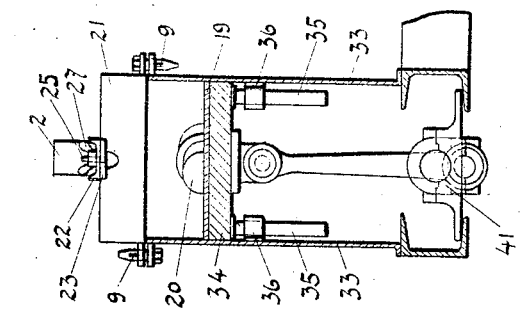

Sept. 30, 1924. 1,509,896
E. ERICSSON
CASTING MACHINE FOR THE MANUFACTURE OF CORE CASTINGS SUCH AS
TUBES AND THE LIKE
Filed Aug. 9, 1922 4 Sheets-Sheet 4
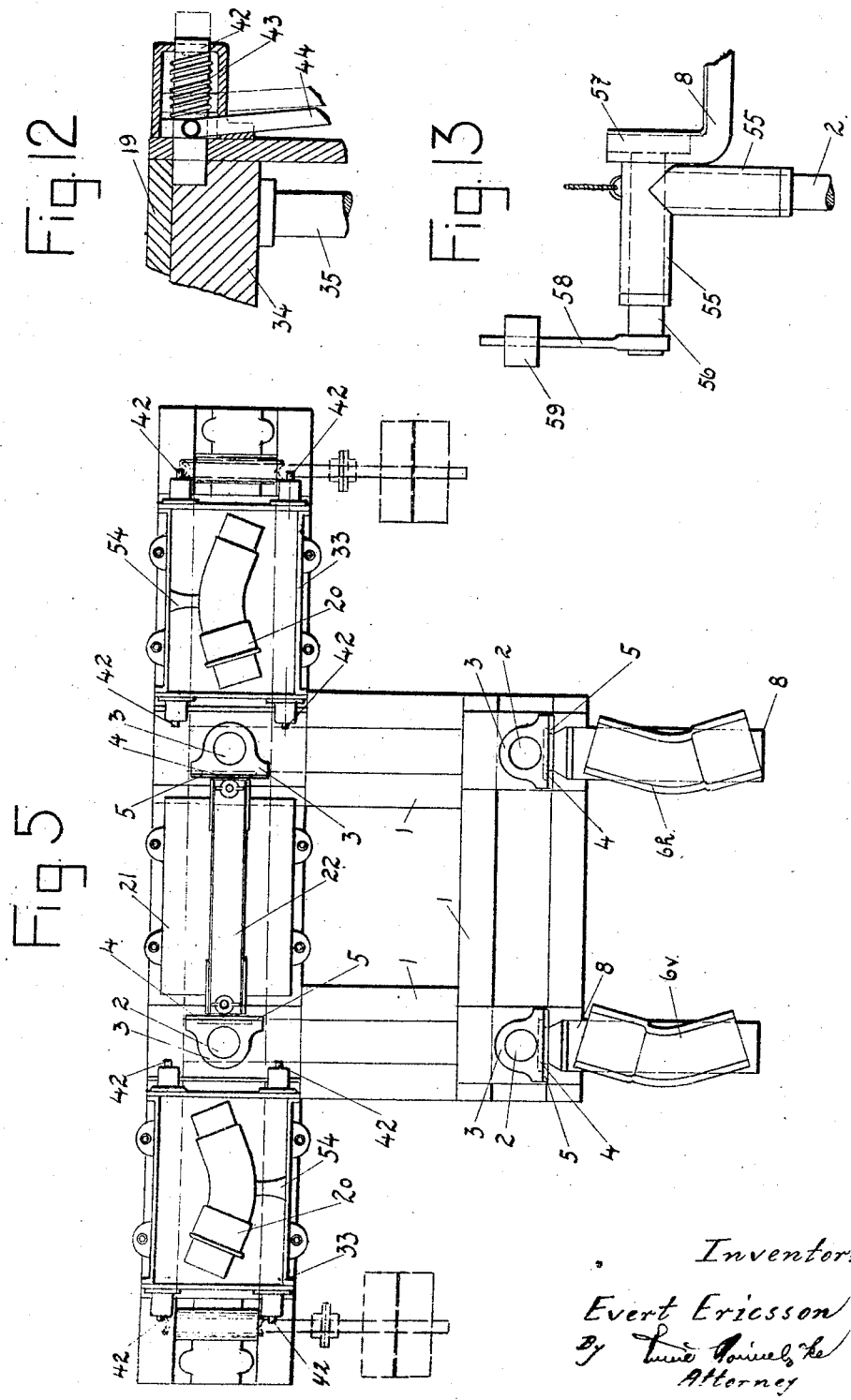
Inventor:
Evert Ericsson Patented Sept. 30, 1924.

1,509,896

UNITED STATES PATENT OFFICE.

EVERT ERICSSON, OF CHRISTIANIA, NORWAY.

CASTING MACHINE FOR THE MANUFACTURE OF CORE CASTINGS SUCH AS TUBES AND THE LIKE.

Application filed August 9, 1922. Serial No. 580,696.

*To all whom it may concern:*

Be it known that I, EVERT ERICSSON, a subject of the King of Norway, residing at Torvet 2, Christiania, Norway, have invented certain new and useful Improvements in Casting Machines for the Manufacture of Core Castings such as Tubes and the like; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

In the manufacture of cast tube parts the process has up to the present been divided in two steps the production of the mould and the production of the core. The latter has been manufactured separately and has been thereupon transferred to the mould. The placing of the core in the mould is a difficult task and it has generally to be carried out quickly as it often occurs that the core is placed eccentrically in the mould, so that an uneven thickness of the cast wall as well as burrs or seams at the tube ends are caused.

The present invention has for its object a machine for producing cast tubes in which the whole process of forming the mould and core as well as placing them together is performed automatically, the machine after having produced the core places the latter accurately in the mould produced simultaneously in the machine or in a chill mounted therein.

In the latter case the machine may be used directly as a casting machine whereby the manufacture is further simplified.

The above mentioned advantages of the present invention are obtained mainly by placing all core boxes, mould boxes and chills on arms, which are rotatably and slidably mounted on a number of vertical columns fastened on the machine frame.

Each of the said arms carries either a core box section or a chill or mould box section, and the columns are so placed with relation to each other that an arm carrying a core box section may be adjusted to engage an arm carrying the corresponding other section of the core box or to engage an arm carrying the corresponding mould box or chill section in order to place the core therein.

Besides being rotatable in planes perpendicular on the axis of the columns the arms carrying the core or mould box sections or chill sections are also adapted to be rotated about an axis perpendicular on the axes of the columns and in the divisional playing of the sections.

Besides the above mentioned arrangement of the several mould and core box sections and chills the machine comprises a number of other details, which will be further specified in the following description with reference to the accompanying drawings:

Fig 1 is a front elevation of a chill casting and core machine and also in dotted lines illustrates a separate moulding machine to be used in co-operation with the core machine.

Fig. 2 is a plan of the machine.

Fig. 3 is a front elevation similar to Fig. 1, but with the chill in position for casting.

Fig. 4 is an elevation similar to Fig. 1 illustrating a combined core chill and pressing moulding machine in accordance with the invention.

Fig. 5 is a plan of the machine illustrated on Fig. 4.

Fig. 6 illustrates part of the machine seen from the end.

Fig. 7 is a section on line *a—a* of Fig. 2 with the mould box in position.

Fig. 8 is a detail elevation illustrating the mould box with core box thereon seen from the side.

Fig. 9 is a detail elevation of the mould box with gripping means seen from the side.

Fig. 10 is an end view seen from the right on Fig. 9.

Fig. 11 is a plan of Fig. 9.

Fig. 12 illustrates a detail of the machine on Fig. 4 on a larger scale.

Fig. 13 illustrates another detail of the machine shown on Fig. 1 on the same scale as Fig. 12.

The machine comprises a bottom frame 1 carrying four vertical columns 2. Columns 2 separate the several core boxes, chills and mould boxes by means of sleeves 3 pivotally and slidably mounted on the said columns.

On said sleeves 3 there are rotatably mounted circular disks 4, which are held in their position in lateral recesses in the sleeves by means of annular disks 5 screwed on to the sleeves. To the circular disks 4 are fastened arms 8, which carry the core boxes 6$^h$ and 6$^v$ and chills 7$^h$ and 7$^v$. The said core boxes and chills are mounted in such a manner on the said arms that the divisional plane between the box and chill sections goes through the axis of rotation of disk 4. Thus when the arms are so adjusted that the divisional plane between the sections is in a vertical position, this plane will go through the axis of the column 2 on which the arm is supported.

By means of this arrangement it is seen that the core boxes 6$^h$, 6$^v$ after being filled with sand may be brought together as illustrated on Fig. 1 and locked in this position by means of bolts 9, whereupon the locked core box 6 may be rotated as desired. Core box sections 6$^h$, 6$^v$ are then adjusted with their divisional plane in a horizontal position, whereupon the top box section is lifted. For this purpose there is provided a lifting apparatus comprising a lifting arm 10, which may be pivoted about a stationary pivot 11 carried by arms 12, which are fastened to rings 13.

The lower end of arm 10 is provided with an oblong slot co-acting with trunnion 14 fastened to ring 15.

The whole lifting apparatus is so arranged that it may be rotated about column 2. Sleeves 3 are supported and maintained in position by means of stop disk 16. In case the chills or core mould boxes are heavy, sleeves 3 may be provided with counter weights to avoid bending stresses on the columns.

After the core box section 6$^h$ has been lifted, section 6$^v$ with core placed therein is rotated one quarter turn about column 2 its supporting arms pointing against a column carrying a chill or mould box. The core section 6$^v$ is now in such a position that chill 7$^v$ may be lowered on to it, whereupon it is locked to the core box section, and in the locked position is rotated about the horizontal longitudinal axis one half turn, whereupon the core box section and chill are unlocked and core box is lifted and brought back to its original position, leaving the core in chill section 7$^v$. Thereupon the chill section is rotated with its supporting arm one quarter turn so as to be brought in engagement with the corresponding chill section 7$^h$ and locked together with the same. After this operation has been performed the locked chill sections with enclosed cores are brought in casting position as illustrated on Fig. 3.

The liquid metal is poured in at opening 49. For tube castings which can not be cast in chills ordinary moulding machines may be used, as indicated in dotted lines on Figs. 1 and 2. The main frame 1 of the machine is then extended so that the forming machines may be placed therein. The said forming machines may be of any suitable known type, and are preferably provided with a lifting device 18 for drawing plate 19, which supports pattern 20.

The moulding box 21 is carried by arm 22, which is fastened to the circular disk 4 in sleeve 3. Moulding box 21 is provided with two handles and ears 23 with oblong holes 24. Two gripping devices comprising a bolt 25 with oblong head 26 are mounted on arm 22 and serves to co-operate with the oblong holes 24.

When arm 22 is placed on the forming machine the grippers or bolts 25 extend downwardly through the holes 24 so far that the oblong head 26 is somewhat below the underside of ear 23. Bolt 25 is then turned so that the oblong part takes up a transverse position with regard to the oblong hole 24 as indicated on Fig. 10.

On the top of bolt 25 there is threaded a winged nut, which is tightened so that the laterally extending parts 28 of the head 26 engage ear 23, thereby locking the moulding box to arm 22. Mould box 21 can then be lifted by means of lifting arm 10. The mould box sections are then handled in the same manner as described in connection with the chill section.

In order to guide the mould box sections 21, when the latter are lowered on to core box sections 6$^v$, arm 8 is provided with two transverse hoops 29 with laterally extending ears 30 which are provided with guiding pins 31 and guiding holes 32.

Figs. 4, 5 and 6 illustrate the machine with automatic pressing mechanism for the mould boxes substantially for the above described hand moulding machines.

The automatic mould pressing mechanism comprises a frame 33 in which is reciprocated piston 34 guided by means of rods 35 and guiding sleeves 36.

Pressing piston 34 is driven by means of crank 37, which is connected with the piston 34 by means of piston rods 38, the latter being connected to the piston 34 by means of brackets 39.

Crank 37 with the crank shaft is driven by means of worm wheel 40 and is mounted in bearings 41. Pressing piston 34 carries the pattern 20 which is surrounded by a stripping plate 19, and when cranks 37 are in their topmost position mould box 21 is finished and piston 34 moves downwards again. When piston 34 reaches its topmost position, stripping plate 19 is locked so that pattern 20 is pulled through plate 19 during the downward movement of the piston.

The locking mechanism is illustrated on

Fig. 12 and comprises a horizontally movable bolt 42, which is pressed against piston 34 by means of spring 43. Bolt 42 is moved by means of arm 44 swinging about point 45. Said arm 44 is maintained in position by means of another arm 46 pivoting about point 47 owing to the lower end 48 of arm 46 being engaged by the guiding shaft 35. When the lower end 48 of arm 46 is in engagement with shaft 35, bolt 42 is in its innermost position, so that the stripping plate 19 with piston 34 can pass upwards. But as soon as piston 34 has reached its top position, shaft 35 has reached a position where arm 46 is out of engagement therewith so that spring 43 presses bolt 42 below stripping plate 19, thereby locking the same until piston 34 has moved so far downwards that the shaft 35 presses arm 46, whereby arm 44 with bolt 42 is returned, and the stripping plate 19 may drop freely on piston 34.

For larger mould and core boxes the supporting device, as illustrated on Fig. 13, is used. This supporting device comprises a T-shaped bracket 55, the vertical part of which encloses the upper part of shaft 2, so that the supporting mechanism is carried by the latter. In the horizontal part of bracket 55 is mounted a shaft 56 provided with a flange 57 to which is fastened arm 8 or 22.

At the opposite end of shaft 56 there is mounted an arm 58 carrying a weight 59 for counter-balancing arm 8 or 22.

As it is well known some kinds of tube castings may be cast in solid cast iron moulds or chills.

When the machine is to be used as a chill casting machine chills $7^h$, $7^v$ are mounted on the rear part of columns 2. The corresponding core boxes $6^h$, $6^v$ are mounted on the front part of columns 2.

Core boxes $6^h$, $6^v$ are adjusted in horizontal position extending downwardly of the front, as illustrated on Fig. 2, whereupon they are filled with sand and provided with the necessary core supports and core irons in the form of perforated tubes through which gases may escape during the casting operation. The sand is somewhat pressed and surplus of sand is scraped off, so that the sand surface is level with the edges of the core box. Core box $6^v$ is then brought with its supporting arm in the position as indicated in dotted lines on Fig. 2, whereupon arm 8 is rotated about its horizontal axis, so that the top of the core box forms an angle of approximately 75° with the horizontal.

The second core box section $6^h$ is brought into the corresponding position and guiding pin 50 is placed in guiding hole 51. Both core box sections are then brought close together, guiding pin 52 entering guiding holes 53. Splints 9 are introduced and fastened thereby locking core box sections $6^h$, $6^v$ together. Then the supporting arms 8 are rotated back to horizontal position splints 9 are removed whereupon core box section $6^h$ is lifted off, and brought back to its original position. Core box $6^v$ with core is brought in position between the left hand pair of columns 2.

Chill section $7^v$ is lowered on to core box section $6^v$ and is locked to the same by means of splints 9. Then the whole is rotated one half turn splints 9 are taken out and core box section $6^v$ is lifted up and brought back to its original position. Chill section $7^v$ is brought in position between the rear pair of columns 2 and chill section $7^h$ is lowered thereon, and the two sections are locked together by means of splints. Thereupon chills $7^h$, $7^v$ are turned into the position illustrated on Fig. 3, where pouring channel 49 is in casting position and the mould is ready for casting.

When the casting is finished chills $7^h$, $7^v$ are again turned back to the horizontal position. The splints are taken out and chill $7^h$ is lifted off and removed. Chill $7^v$ is then turned round so that the cast tube part drops on to the conveyer serving to carry the same away.

In the meantime a new core has been brought in position between the left hand of columns 2 and the operations are repeated.

If the machine is to be used as a combined moulding and hand pressing machine two moulding machines as indicated in dotted lines in Figs. 1 and 2 are used, and the mould box holders 22 are mounted on the rear pair of columns 2. On arm 8 is mounted cross arms 29 which serve to guide mould boxes 21. The core is produced as previously specified. The empty mould boxes 21 are placed on moulding machines $17^h$, $17^v$, filled with sand and hand pressed, the stripping plate 19 of the mould box resting thereon is lifted.

The pattern is then completely free from all sand, and the mould box may be lifted from the machine by means of handle 10 after the carrying mechanism 22 is placed on the mould box in such a manner that head 26 on bolt 25 passes through the oblong hole 24.

Bolt 25 is now turned so that the projecting plates 28 of head 26 take up a transverse position with regard to the oblong hole 24.

The winged nut 27 is tightened thereby locking mould box 21 to carrying mechanism 22.

The machine is operated by means of two workers one holding the core forming part and the other the mould forming part.

When mould box 21 is already pressed, the core box $6^v$ is in position between the left hand pair of columns. The mould box from machine $17^v$ is turned in between the same pair of columns and is lowered on core box $6^v$, as illustrated on Fig. 7 and Fig. 8.

Splints 9 are introduced and fastened. The combined members are then rotated so that the core box section lies uppermost, whereupon the latter is lifted off and brought back to its original position.

The mould box from machine 17ᵛ is now brought in position between the rear pair of columns 2, and mould box from machine 17ʰ is turned forwards and lowered on the mould box from machine 17ᵛ. These mould box sections are now locked together and turned so that the pouring opening 54 is in casting position.

The mould may now be cast or may be separated from the supporting mechanism 22 by loosening nut 27 and turning bolts 25, so that the oblong heads 26 may be extracted through holes 24. The carrying mechanism 22 may then be moved away from the mould box which may be removed for casting.

If the machine is to be used as a combined mechanical moulding machine, the press moulding machine is mounted as illustrated on Figs. 4, 5 and 6. The production of the core takes place as previously specified, and the pressing of mould boxes 21 takes place by means of pressing pistons 34, on which the pattern 20 is mounted. These pistons 34 are first lowered and filled with sand to a level of frame 33 over piston 34 with pattern 20. Frame box 21 is placed thereon and locked in position by means of splints 9. The machine is then started so that piston 34 moves upwards.

Thereby the sand on top of piston 34 is pressed into mould box 21. When piston 34 has reached its top position, so that stripping plate 19 is accurately in level with the upper edge of frame 33 as well as with the lower edge of the mould box, bolt 42 slips in, as illustrated on Fig. 12, thereby locking stripping plate 19, so that the latter is maintained stationary, while piston 34 with pattern 20 moves downwardly pouring the pattern out.

Piston 34 is guided by shafts 35. These shafts also guide bolt 42 in the following manner. As soon as piston 34 with shafts 35 reach their top position, arm 46 is allowed to spring forward below shaft 35, whereby even arm 44 and the locking bolt 42 actuated by spring 43 is allowed to move in such a manner that stripping plate 19 is locked and prevented from following piston 34 downwards. However when piston 34 has performed some movement downwards, shaft 35 will again engage arm 46 and bring the same back in its previous position, whereby the locking bolt 42 is drawn out, so that stripping plate 19 is allowed to drop freely back to its original position on piston 34.

Mould box 21 is now finished, wherefor the carrying device is fastened, as previously described, and mould box 21 is lifted from the machine by pressing handle 10 downwards and place the core in position and lock together mould boxes 21. Also the casting and removal of the supporting mechanisms 22 takes place in the manner previously specified.

It is obvious that the machine may also be combined with other moulding machines, and the core forming device may be provided with a pressing mechanism for finishing the cores in the same manner as the moulds.

Claims:

1. In a casting machine for the manufacture of core castings such as tube parts and the like a machine frame, supporting columns thereon, supporting arms pivotally and slidably mounted on said columns and means for fastening core box and mould box or chill sections on said supporting arms, said supporting columns being so placed with relation to each other, that the sections carried by said supporting arms may be brought in engagement with corresponding sections on two or more other supporting arms.

2. In a casting machine for the manufacture of core castings such as tube parts and the like a machine frame, supporting columns thereon, sleeves rotatably and slidably mounted on said supporting columns rotatably mounted on said sleeves perpendicularly on said supporting columns, and means for fastening core box and mould box or chill sections on said supporting arms, said supporting columns being so placed with relation to each other that the sections carried by said supporting arms may be brought in engagement with corresponding sections on two or more other supporting arms.

3. In a casting machine for the manufacture of core castings such as tube parts and the like a machine frame, vertical supporting columns thereon, the axes of said columns forming the edges of a square prism, sleeves rotatably and slidably mounted on said supporting columns supporting arms rotatably mounted on said sleeves perpendicularly on said supporting columns, and means for fastening core box and mould box or chill sections on said supporting arms, said supporting columns being so placed with relation to each other that the sections carried by said supporting arms may be brought in engagement with corresponding sections on two or more other supporting arms.

4. In a casting machine for the manufacture of core castings such as tube parts and the like, a machine frame, supporting columns thereon, sleeves rotatably and slidably mounted on said supporting columns, supporting arms rotatably mounted on said sleeves perpendicularly on said supporting columns, means for fastening core box sections on the arms of two adjacent columns and means for fastening mould box or chill sections on the arms of the two other columns.

5. In a casting machine for the manufacture of core castings such as tube parts and the like a machine frame, supporting columns thereon, sleeves rotatably and slidably mounted on said supporting columns, supporting arms rotatably mounted on said sleeves perpendicularly on said supporting columns and means comprising bolts with oblong heads and ears with oblong holes for fastening a core box or mould box or chill section to said supporting arms.

6. In a casting machine for the manufacture of core castings such as tube parts and the like a machine frame, supporting columns thereon, sleeves rotatably and slidably mounted on said supporting columns, supporting arms rotatably mounted on said sleeves perpendicularly on said supporting columns, and means for displacing said sleeves axially on said supporting columns.

7. In a casting machine for the manufacture of core castings such as tube parts and the like a machine frame, supporting columns thereon, sleeves rotatably and slidably mounted on said supporting columns, supporting arms rotatably mounted on said sleeves perpendicularly on said supporting columns, brackets rotatably mounted at the base of said columns, two-armed levers pivoted on said brackets, one arm of said two-armed levers engaging said sleeves in order to enable the same to be displaced axially on said columns.

8. In a casting machine for the manufacture of core castings such as tube parts and the like a machine frame, supporting columns thereon, sleeves rotatably and slidably mounted on said supporting columns, supporting arms rotatably mounted on said sleeves perpendicularly on said supporting columns, brackets rotatably mounted at the base of said columns, two-armed levers pivoted on said brackets, one arm of said two-armed levers engaging a ring rotatably connected with said sleeves in order to enable the same to be displaced axially on said columns.

9. In a casting machine for the manufacture of core castings such as tube parts and the like a machine frame, supporting columns thereon, sleeves rotatably and slidably mounted on said supporting columns, supporting arms rotatably mounted on said sleeves perpendicularly on said supporting columns, weights for counterbalancing said arms on said sleeves, and means for fastening core box and mould box or chill sections on said supporting arms, said supporting columns being so placed with relation to each other that the sections carried by said supporting arms may be brought in engagement with corresponding sections on two or more other supporting arms.

10. In a casting machine for the manufacture of core castings such as tube parts and the like a machine frame, supporting columns thereon, T-shaped sleeves resting with their stem enclosing the top of said columns and supporting arms rotatably mounted in the horizontal part of the T-shaped sleeve.

11. In a casting machine for the manufacture of core castings such as tube parts and the like a machine frame, supporting columns thereon, T-shaped sleeves resting with their stem enclosing the top of said columns, shafts rotatably mounted in the horizontal part of said T-shaped sleeve, supporting arms secured to one end of said shafts and weights for counter-balancing said supporting arms secured to the opposite end of said sleeves.

12. In a casting machine for the manufacture of core castings such as tube parts and the like a machine frame, supporting columns thereon, T-shaped sleeves resting with their stem enclosing the top of said columns, and means for displacing said T-shaped sleeves axially on said columns.

13. The combination with the casting machine as claimed in claim 1, a mould pressing machine of the kind where the pressing of the mould takes place in frames (33) by means of pistons (34), which are actuated by means of crank shafts.

14. A casting machine comprising a frame; columns mounted on said frame; and an arm rotatably mounted on each of said columns and adapted to support a section of a mould, two of said arms comprising a complete mould.

15. A casting machine comprising a frame; columns mounted on said frame; a sleeve rotatably mounted on each column; and an arm rotatably mounted in said sleeve and adapted to support a section of a mould, two of said arms comprising a complete mould.

16. A casting machine comprising a frame; columns mounted on said frame; and an arm rotatably mounted on each of said columns and adapted to support a section of a mould.

17. A casting machine comprising a frame; columns mounted on said frame; a sleeve rotatably and slidably mounted on each of said columns; and an arm rotatably mounted on each sleeve adapted to receive a section of a mould or core box, said columns being spaced so that each two adjacent arms may be rotated to fall in alignment one over the other.

18. A casting machine comprising a frame; columns mounted on said frame; a sleeve rotatably and slidably mounted on each of said columns; means on said column for sliding said sleeve; and an arm rotatably mounted on each sleeve adapted to receive a section of a mould, said columns being spaced so that each two adjacent arms may be rotated to fall in alignment one over the other.

In testimony that I claim the foregoing as my invention, I have signed my name in presence of two subscribing witnesses.

EVERT ERICSSON.

Witnesses:
EDWARD JOHNSON,
E. E. ARC.